United States Patent [19]
Carlbäck

[11] Patent Number: 6,062,180
[45] Date of Patent: May 16, 2000

[54] DEVICE FOR INCREASING CRANKCASE COMPRESSION IN AN INTERNAL COMBUSTION ENGINE

[75] Inventor: Per Carlbäck, Huskvarna, Sweden

[73] Assignee: AB Electrolux, Stockholm, Sweden

[21] Appl. No.: 09/155,633

[22] PCT Filed: Nov. 1, 1996

[86] PCT No.: PCT/SE96/01408

§ 371 Date: Sep. 29, 1998

§ 102(e) Date: Sep. 29, 1998

[87] PCT Pub. No.: WO97/38214

PCT Pub. Date: Oct. 16, 1997

[30] Foreign Application Priority Data

Apr. 9, 1996 [SE] Sweden ................................ 9601334

[51] Int. Cl.[7] ................................................ F02B 33/04
[52] U.S. Cl. .................... 123/73 R; 123/317; 123/197.4
[58] Field of Search ................. 123/73 A, 73 R, 123/73 AD, 74 AE, 317, 197.4

[56] References Cited

U.S. PATENT DOCUMENTS

| | | | |
|---|---|---|---|
| 1,038,541 | 9/1912 | Ducker | 123/73 R |
| 1,081,480 | 12/1913 | Aslakson | 123/73 A |
| 1,396,045 | 11/1921 | Mellen | 123/317 |
| 3,280,805 | 10/1966 | Muller | 123/73 R |
| 3,859,968 | 1/1975 | Stinebaugh | 123/317 |
| 5,529,027 | 6/1996 | Okubo | 123/41.01 |
| 5,782,217 | 7/1998 | Ito et al. | 123/193.6 |

FOREIGN PATENT DOCUMENTS 521718  3/1921  France.

*Primary Examiner*—Erick R. Solis
*Assistant Examiner*—Brian Hairston
*Attorney, Agent, or Firm*—Pearne, Gordon, McCoy & Granger LLP

[57] ABSTRACT

A device for increasing crankcase compression in an internal combustion engine. The device includes a holder having an annular peripheral wall joined to an end wall. The holder is mounted on a crankshaft of the engine, between a main bearing and a crank portion with a counterweight. The crankshaft extends through the end wall and is surrounded by the peripheral wall. Lightweight filling bodies are disposed in the holder.

12 Claims, 3 Drawing Sheets

DEVICE FOR INCREASING CRANKCASE COMPRESSION IN AN INTERNAL COMBUSTION ENGINE

BACKGROUND OF THE INVENTION

The present invention relates to a device for increasing crankcase compression in an internal combustion engine, said engine comprising a crankshaft having main bearings and at least one crank portion including a counterweight, and filling bodies forming an annular unit together with said crank portion.

It is previously known that the performance of a two-cycle engine can be improved by increasing the crankcase compression, which can be achieved by reducing the volume of the crankcase. To this end it has been proposed to use various types of lightweight filling bodies attached to the crank portion of the crankshaft. Such a filling body is preferably shaped so as to form an annular unit together with the crank portion. The disadvantage of such known devices is that the manufacture and mounting thereof are relatively complicated and costly and they have therefore not been used to any great extent.

Although the device according to the invention is primarily intended to be used in two-cycle engines, it may also be applicable in four-cycle engines, namely such engines of the type using crankcase scavenging for the purpose of lubrication by fuel mixed with lubricating oil. Such four-cycle engines may be used for example in tools having greatly varying angular working positions preventing the use of a normal pressurized lubrication system. The invention is therefore not restricted to two-cycle engines.

SUMMARY OF THE INVENTION

According to the invention, a device for increasing the crankcase compression has been provided which is uncomplicated in manufacture and can thus be produced at low cost. Another advantage is that the device can be easily mounted in the engine and is consequently well adapted to rational series production. A further advantage is that no alteration of the crankshaft is required, and neither is any costly modification of other parts of the engine.

The above advantages have been achieved by means of a device of the kind mentioned in the introduction which according to the invention is generally characterized in that the filling bodies are provided in a holder comprising an annular, peripheral wall adapted to surround said crank portion.

BRIEF DESCRIPTION OF THE DRAWINGS

The invention will be described in more detail in the following with reference to the accompanying drawings, in which.

DETAILED DESCRIPTION OF THE PREFERRED EMBODIMENTS

Figure 1:
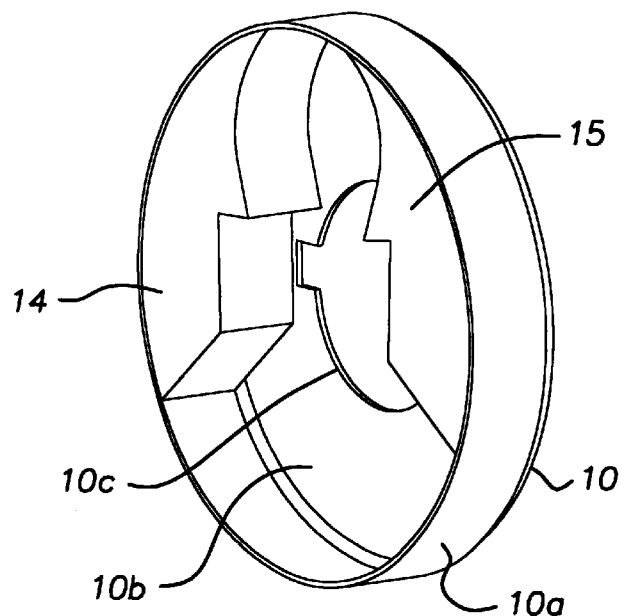
FIG. 1 is a perspective view of a preferred embodiment of the device according to the invention.
Figure 2:
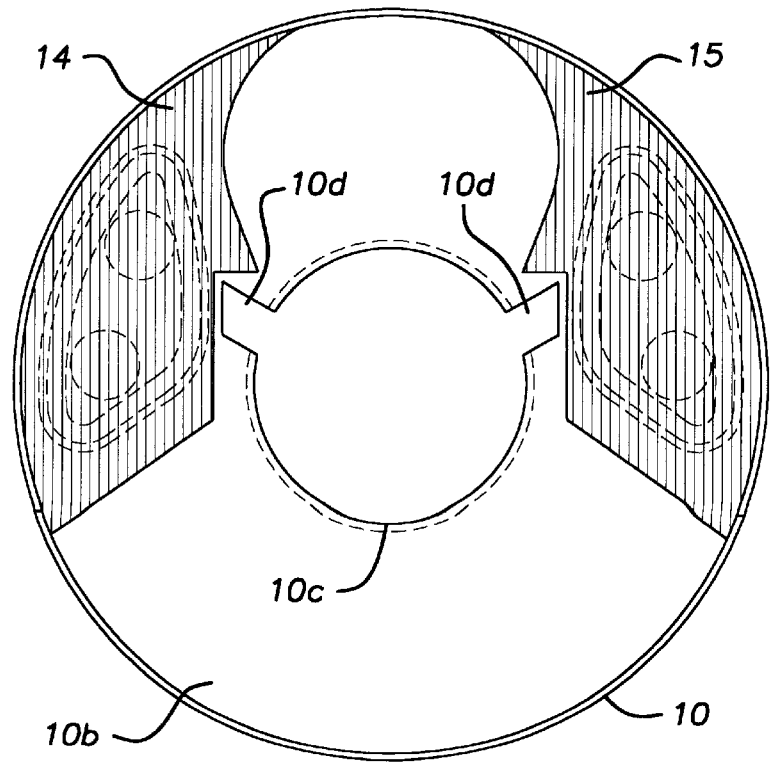
FIG. 2 is a front plan view on a larger scale of the device shown in FIG. 1.
Figure 3:
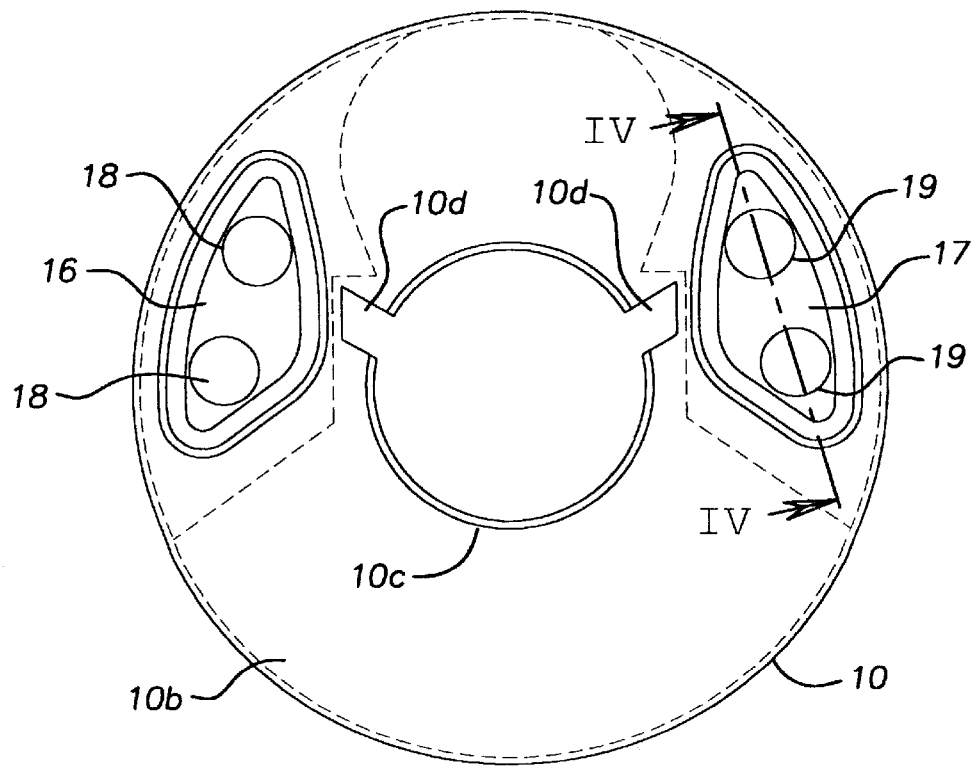
FIG. 3 is a rear plan view on a larger scale of the same device.

The preferred embodiment of the device shown in the drawings comprises a cup-shaped, cylindrical holder 10, preferably made of metal, such as sheet steel or light metal, or reinforced plastic, such as glass fiber reinforced polyamide. The holder 10 comprises a peripheral, cylindrical wall 10a, and a plane end wall 10b, said last mentioned wall having a central opening 10c for receiving a crankshaft 11. As is best seen in FIGS. 2 and 3, the end wall 10b has recesses 10d for providing gas communication as will be described below. The cylindrical wall 10a has a diameter adapted to surrounding the crank portion 12 of the crankshaft with a suitable fit, and the crank portion has a counterweight 13, as is conventional. The holder is furthermore provided with filling bodies 14, 15 having a shape corresponding to the space between the crank portion 12 and the peripheral wall 10a. In order to minimize the influence of the filling bodies on the balance of the crankshaft the filling bodies are made of a lightweight material such as glass fiber reinforced plastic, or a light metal such as aluminium or magnesium. The filling bodies can be made as hollow shells, or as homogeneous bodies of lightweight material.

Figure 4:
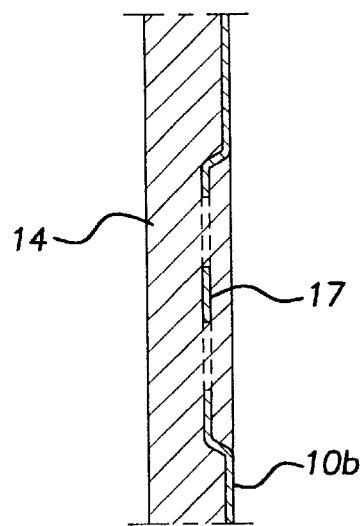
FIG. 4 is a sectional view along line IV—IV in FIG. 3.

For attaching the filling bodies to the holder 10 the end wall 10b is provided with two depressions 16, 17, each having two openings 18, 19, respectively. During manufacture the filler bodies 14, 15 are molded in situ in the holder 10, the material filling also the openings 18, 19 and the depressions 16, 17, as shown in FIG. 4. The filling bodies are thereby permanently attached to the holder 10. As an alternative, the filling bodies and the holder may be made integral, either of light metal by for example die casting, or of above-mentioned plastic material by injection molding or vacuum forming.

Figure 5:
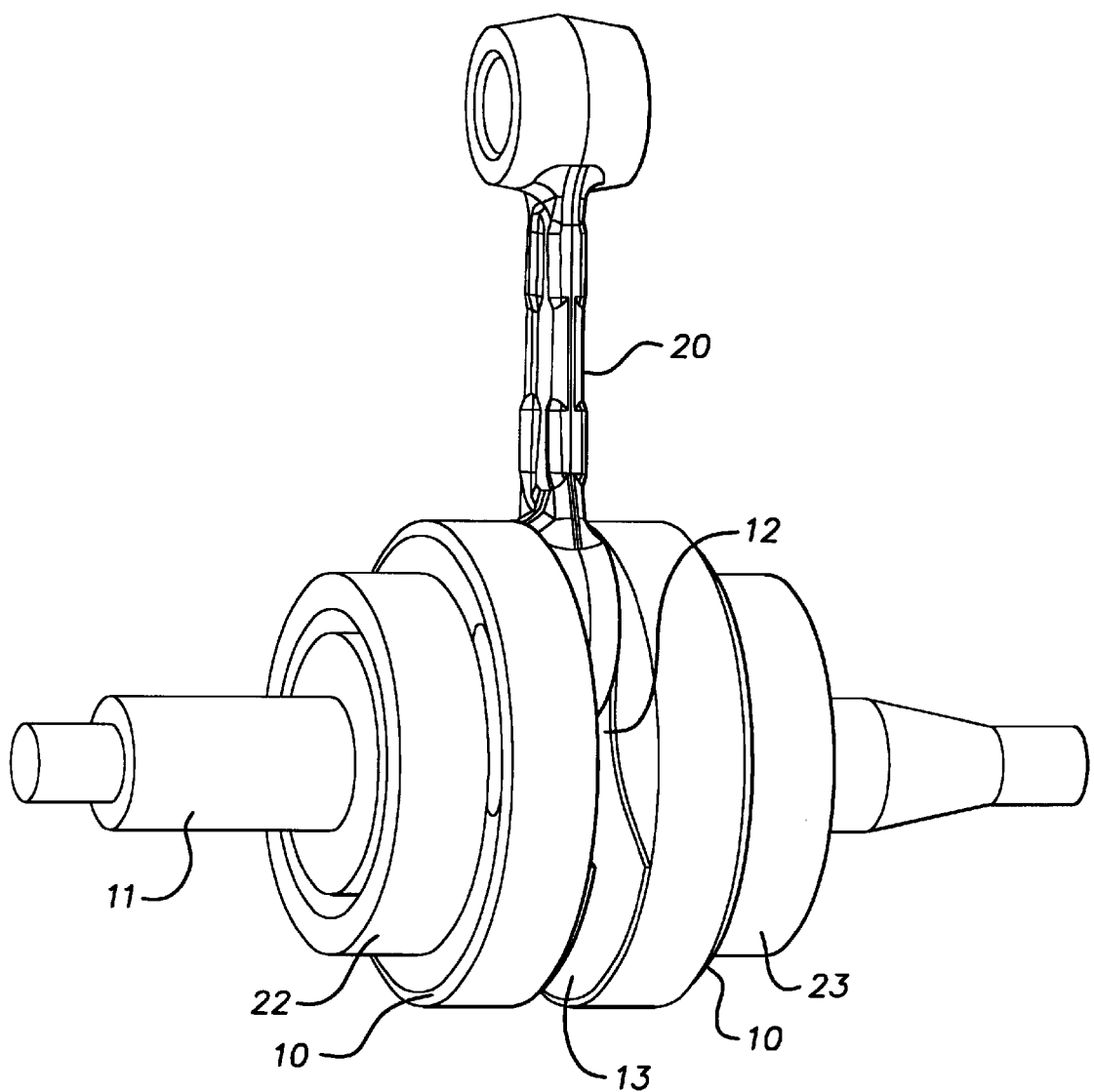
FIG. 5 is a perspective view of a crankshaft provided with the device according to the invention.

The crankshaft 11 shown in FIG. 5 is of a conventional type provided with two crank portions 12 and a connecting rod 20 connected thereto. Each of the crank portions is provided with a device according to the invention. The crankshaft is rotatably journalled in a crankcase (not shown) by means of two main bearings 22, 23. As can be seen in the Figure, the holders 10 are mounted on the crankshaft between the respective main bearing and crank portion and are thereby held in place in the correct position without the need for any special attachment means. In order to achieve correct fixing of the device without play the distance between the main bearing and the crank portion is adapted to the thickness of the wall 10b. Sufficient lubrication of the main bearings is ensured by the recesses 10d of the end wall, through which fuel/oil mixture is supplied to the main bearings during operation of the engine.

It is also within the framework of the invention to attach the holder 10 to the crank portion by other methods. For example, the peripheral wall 10a could surround the crank portion by a suitable press fit. In another modification, the end wall 10b could have another configuration than the shown plane shape, or could be omitted entirely, the filling bodies being instead attached to the peripheral wall 10a. Such attachment can be made as described above, or the filling bodies can be made integral with the holder. It should also be clear that the volume of the filling bodies can be modified according to the desired performance of the actual engine and need thus not have the generally maximum volume shown in the drawings.

I claim:

1. A device for increasing crankcase compression in an internal combustion engine, said engine comprising a crankshaft (11) having main bearings (22, 23) and at least one crank portion (12) including a counterweight (13), and filling bodies forming an annular unit together with said crank portion, wherein the filling bodies (14, 15) are provided in a holder (10) comprising an annular, peripheral wall (10a) adapted to completely surround said crank portion, said holder being disposed between one of said main bearings and said crank portion, and said filling bodies having a shape corresponding to the space between the crank portion and the peripheral wall.

2. Device according to claim 1, wherein the holder (10) comprises an end wall (10b) connected to the peripheral wall (10a) and having a central opening (10c) for receiving the crankshaft (11).

3. Device according to claim 2, wherein at least one axial passage (10d) is formed in the end wall, said axial passage allowing a flow of fuel mixed with lubricating oil to flow therethrough to lubricate the main bearing.

4. Device according to claim 1, wherein the filling bodies (14, 15) are made of reinforced plastic.

5. Device according to claim 1, wherein the filling bodies (14, 15) are hollow.

6. Device according to claim 1, wherein the filling bodies (14, 15) are homogeneous.

7. Device according to claim 1, wherein the filling bodies (14, 15) are made integral with the holder (10).

8. Device according to claim 7, wherein the filling bodies (14, 15) and the holder (10) are made of reinforced plastic by injection molding or vacuum forming.

9. Device according to claim 7, wherein the filling bodies (14, 15) and the holder (10) are made of light metal by die casting.

10. Device according to claim 1, wherein the filling bodies (14, 15) and the holder (10) are made of reinforced plastic by injection molding or vacuum forming.

11. Device according to claim 1, wherein the filling bodies (14, 15) and the holder (10) are made of light metal by die casting.

12. Device according to claim 1, wherein the holder (10) is attached to the crank portion (12) by a press fit.

* * * * *

UNITED STATES PATENT AND TRADEMARK OFFICE
CERTIFICATE OF CORRECTION

PATENT NO. : 6,062,180
DATED : May 16, 2000
INVENTOR(S) : Carlback

It is certified that error appears in the above-identified patent and that said Letters Patent is hereby corrected as shown below:

On Title Page, References Cited, Section [56], U.S. PATENT DOCUMENTS, insert
--941,376  11/1909  Lucas--.

On Title Page, References Cited, Section [56], FOREIGN PATENT DOCUMENTS, insert
--290,388  3/1927  Great Britain--.

Column 2, line 15, after "crankshaft", insert --,--.

Column 2, line 20, after "10", insert --,--.

Column 2, line 41, after "play", insert --,--.

Column 2, line 44, after "wall", insert --10b--.

Signed and Sealed this

Tenth Day of April, 2001

Attest:

NICHOLAS P. GODICI

Attesting Officer

Acting Director of the United States Patent and Trademark Office